(12) United States Patent
Liu et al.

(10) Patent No.: US 12,381,245 B2
(45) Date of Patent: *Aug. 5, 2025

(54) POLYELECTROLYTE MULTILAYER COATED PROTON EXCHANGE MEMBRANE FOR ELECTROLYSIS AND FUEL CELL APPLICATIONS

(71) Applicant: UOP LLC, Des Plaines, IL (US)

(72) Inventors: Chunqing Liu, Arlington Heights, IL (US); Xueliang Dong, Schaumburg, IL (US); Chaoyi Ba, Schaumburg, IL (US)

(73) Assignee: UOP LLC, Des Plaines, IL (US)

( * ) Notice: Subject to any disclaimer, the term of this patent is extended or adjusted under 35 U.S.C. 154(b) by 88 days.

This patent is subject to a terminal disclaimer.

(21) Appl. No.: 17/451,227

(22) Filed: Oct. 18, 2021

(65) Prior Publication Data

US 2023/0123137 A1    Apr. 20, 2023

(51) Int. Cl.
*H01M 8/1032* (2016.01)
*H01M 8/1025* (2016.01)
(Continued)

(52) U.S. Cl.
CPC ....... *H01M 8/1032* (2013.01); *H01M 8/1025* (2013.01); *H01M 8/1027* (2013.01);
(Continued)

(58) Field of Classification Search
CPC ............. H01M 8/1032; H01M 8/1025; H01M 8/1027; H01M 8/103; H01M 8/1039;
(Continued)

(56) References Cited

U.S. PATENT DOCUMENTS

2003/0228523 A1    12/2003    DeLongchamp et al.
2007/0020501 A1    1/2007    Li et al.
(Continued)

FOREIGN PATENT DOCUMENTS

CN    102935389 A    2/2013
CN    104923092 A    9/2015
(Continued)

OTHER PUBLICATIONS

Lutkenhaus and Hammond, "Electrochemically enabled polyelectrolyte multilayer devices: from fuel cells to sensors", 2007, RSC, Soft Matter, 3, p. 804-816 (Year: 2007).*

(Continued)

*Primary Examiner* — Laura Weiner

(57) ABSTRACT

A new polyelectrolyte multilayer coated proton-exchange membrane for electrolysis and fuel cell applications has been developed for electrolysis and fuel cell applications. The polyelectrolyte multilayer coated proton-exchange membrane comprises: a cation exchange membrane, and a polyelectrolyte multilayer coating on one or both surfaces of the cation exchange membrane. The polyelectrolyte multilayer coating comprises alternating layers of a polycation polymer and a polyanion polymer. The polycation polymer layer is deposited on and is in contact with the cation exchange membrane. The top layer of the polyelectrolyte multilayer coating can be either a polycation polymer layer or a polyanion polymer layer.

5 Claims, 6 Drawing Sheets

(51) Int. Cl.
  *H01M 8/1027* (2016.01)
  *H01M 8/103* (2016.01)
  *H01M 8/1039* (2016.01)
  *H01M 8/1053* (2016.01)
  *H01M 8/1081* (2016.01)
  *H01M 8/1088* (2016.01)

(52) U.S. Cl.
  CPC ......... *H01M 8/103* (2013.01); *H01M 8/1039* (2013.01); *H01M 8/1053* (2013.01); *H01M 8/1081* (2013.01); *H01M 8/1088* (2013.01); *H01M 2300/0082* (2013.01); *H01M 2300/0085* (2013.01)

(58) Field of Classification Search
  CPC ............. H01M 8/1053; H01M 8/1081; H01M 8/1088; H01M 2300/0082; H01M 2300/0085
  See application file for complete search history.

(56) References Cited

U.S. PATENT DOCUMENTS

| | | | |
|---|---|---|---|
| 2007/0141456 A1 | 6/2007 | Wang et al. | |
| 2009/0197138 A1* | 8/2009 | Hammond | H01M 8/1027 429/413 |

FOREIGN PATENT DOCUMENTS

| | | |
|---|---|---|
| CN | 105107393 A | 12/2015 |
| CN | 106099147 A | 11/2016 |

OTHER PUBLICATIONS

White, "Coating of Nafion Membranes with Polyelectrolyte Multilayers to Achieve High Monovalent/Divalent Cation Electrodialysis Selectivities", 2015, ACS Appl. Mater. Interfaces, 7, 12, 6620-6628 (Year: 2015).*

Yu, Jinming, "Preparation and Characterization of Layer-by-Layer Self-Assembly Membrane Based on Sulfonated Polyetheretherketone and Polyurethane for High-Temperature Proton Exchange Membrane", Journal of Polymer Science Part A: Polymer Chemistry, vol. 55, p. 3446-3454 (Year: 2017).*

Written Opinion from corresponding PCT Application No. PCT/US2022/078045, completed on Feb. 6, 2023.

International Search Report from corresponding PCT Application No. PCT/US2022/078045, mailed on Feb. 6, 2023.

Liu, Chunqing et al., U.S. Appl. No. 17/162,421, filed Jan. 29, 2021 and entitled "Composite Proton Conductive Membranes".

Extended European Search report from corresponding European application 22884591.3 dated Jun. 24, 2025.

* cited by examiner

POLYELECTROLYTE MULTILAYER COATED PROTON EXCHANGE MEMBRANE FOR ELECTROLYSIS AND FUEL CELL APPLICATIONS

BACKGROUND

Hydrogen as an energy vector for grid balancing or power-to-gas and power-to-liquid processes plays an important role in the path toward a low-carbon energy structure that is environmentally friendly. Water electrolysis produces high quality hydrogen by electrochemical splitting of water into hydrogen and oxygen; the reaction is given by Eq. 1 below. The water electrolysis process is an endothermic process and electricity is the energy source. Water electrolysis has zero carbon footprint when the process is operated by renewable power sources, such as wind, solar, or geothermal energy. The main water electrolysis technologies include alkaline electrolysis, proton exchange membrane (PEM) water electrolysis (PEMWE as shown in FIG. 1), anion exchange membrane (AEM) water electrolysis (AEMWE as shown in FIG. 2), and solid oxide water electrolysis.

As shown in FIG. 1, in a PEMWE system 100, an anode 105 and a cathode 110 are separated by a solid PEM electrolyte 115, such as a sulfonated tetrafluoroethylene based cofluoropolymer sold under the trademark Nafion® by Chemours company. The anode and cathode catalysts typically comprise $IrO_2$ and Pt, respectively. At the positively charged anode 105, pure water 120 is oxidized to produce oxygen gas 125, electrons ($e^-$), and protons; the reaction is given by Eq. 2. The protons are transported from the anode 105 to the cathode 110 through the PEM 115 that conducts protons. At the negatively charged cathode 110, a reduction reaction takes place with electrons from the cathode 110 being given to protons to form hydrogen gas 130; the reaction is given by Eq. 3. The PEM 115 not only conducts protons from the anode 105 to the cathode 110, but also separates the $H_2$ gas 130 and $O_2$ gas 125 produced in the water electrolysis reaction. PEM water electrolysis is one of the favorable methods for conversion of renewable energy to high purity hydrogen with the advantage of compact system design at high differential pressures, high current density, high efficiency, fast response, small footprint, lower temperature (20-90° C.) operation, and high purity oxygen byproduct. However, one of the major challenges for PEM water electrolysis is the high capital cost of the cell stack comprising expensive acid-tolerant stack hardware such as the Pt-coated Ti bipolar plates, expensive noble metal catalysts required for the electrodes, as well as the expensive PEM.

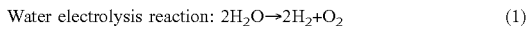

Water electrolysis reaction: $2H_2O \rightarrow 2H_2+O_2$ (1)

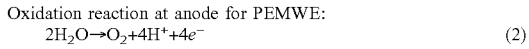

Oxidation reaction at anode for PEMWE:
$2H_2O \rightarrow O_2+4H^++4e^-$ (2)

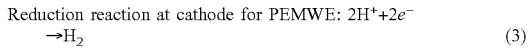

Reduction reaction at cathode for PEMWE: $2H^++2e^- \rightarrow H_2$ (3)

AEMWE is a developing technology. As shown in FIG. 2, in the AEMWE system 200, an anode 205 and a cathode 210 are separated by a solid AEM electrolyte 215. Typically, a water feed 220 with an added electrolyte such as dilute KOH or $K_2CO_3$ or a deionized water is fed to the cathode side. The anode and cathode catalysts typically comprise platinum metal-free Ni-based or Ni alloy catalysts. At the negatively charged cathode 210, water is reduced to form hydrogen 225 and hydroxyl ions by the addition of four electrons; the reaction is given by Eq. 4. The hydroxyl ions diffuse from the cathode 210 to the anode 205 through the AEM 215 which conducts hydroxyl ions. At the positively charged anode 205, the hydroxyl ions recombine as water and oxygen 230; the reaction is given by Eq. 5. The AEM 215 not only conducts hydroxyl ions from the cathode 210 to the anode 205, but also separates the $H_2$ 225 and $O_2$ 230 produced in the water electrolysis reaction. The AEM 215 allows the hydrogen 225 to be produced under high pressure up to about 35 bar with very high purity of at least 99.9%.

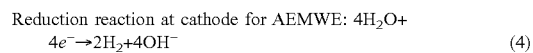

Reduction reaction at cathode for AEMWE: $4H_2O+ 4e^- \rightarrow 2H_2+4OH^-$ (4)

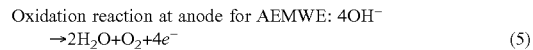

Oxidation reaction at anode for AEMWE: $4OH^- \rightarrow 2H_2O+O_2+4e^-$ (5)

AEMWE has an advantage over PEMWE because it permits the use of less expensive platinum metal-free catalysts, such as Ni and Ni alloy catalysts. In addition, much cheaper stainless steel bipolar plates can be used in the gas diffusion layers (GDL) for AEMWE, instead of the expensive Pt-coated Ti bipolar plates currently used in PEMWE. However, the largest impediments to the development of AEM systems are membrane hydroxyl ion conductivity and stability, as well as lack of understanding of how to integrate catalysts into AEM systems. Research on AEMWE in the literature has been focused on developing electrocatalysts, AEMs, and understanding the operational mechanisms with the general objective of obtaining a high efficiency, low cost and stable AEMWE technology.

Fuel cells, as a next generation clean energy resource, convert the energy of chemical reactions such as an oxidation/reduction redox reaction of hydrogen and oxygen into electric energy. The three main types of fuel cells are alkaline electrolyte fuel cells, polymer electrolyte membrane fuel cells, and solid oxide fuel cells. Polymer electrolyte membrane fuel cells may include proton exchange membrane fuel cells (PEMFC), anion exchange membrane fuel cells (AEMFC), and direct methanol fuel cells. PEMFC uses a PEM to conduct protons from the anode to the cathode, and it also separates the $H_2$ and $O_2$ gases to prevent gas crossover. AEMFC uses an AEM to conduct $OH^-$ from the cathode to the anode, and it also separates the $H_2$ and $O_2$ gases to prevent gas crossover.

The anode in an electrochemical cell is the electrode at which the predominant reaction is oxidation (e.g., the water oxidation/oxygen evolution reaction electrode for a water electrolyzer, or the hydrogen oxidation electrode for a fuel cell). The cathode in an electrochemical cell is the electrode at which the predominant reaction is reduction (e.g., the proton reduction/hydrogen evolution reaction electrode for a water electrolyzer, or the oxygen reduction electrode for a fuel cell). The membrane is one of the key materials that make up an electrolysis cell or a fuel cell and is an important driver for safety and performance. Some important properties for membranes for fuel cells and membrane electrolysis include high conductivity, high ionic permeability, high ionic exchange capacity (for ion-exchange membrane), high ionic/$H_2$ and $O_2$ selectivity (low $H_2$ and $O_2$ permeability/crossover), low price, low area resistance to minimize efficiency loss resulting from ohmic polarization, high resistance to oxidizing and reducing conditions, being chemically inert at a wide pH range, high thermal stability together with high proton conductivity, and high mechanical strength (thickness, low swelling).

Significant advances are needed in cost-effective, high performance, stable catalysts, membrane materials, as well as other cell stack components for water electrolysis and fuel cells with a wide range of applications in renewable energy systems.

DESCRIPTION OF THE INVENTION

Figure 1:
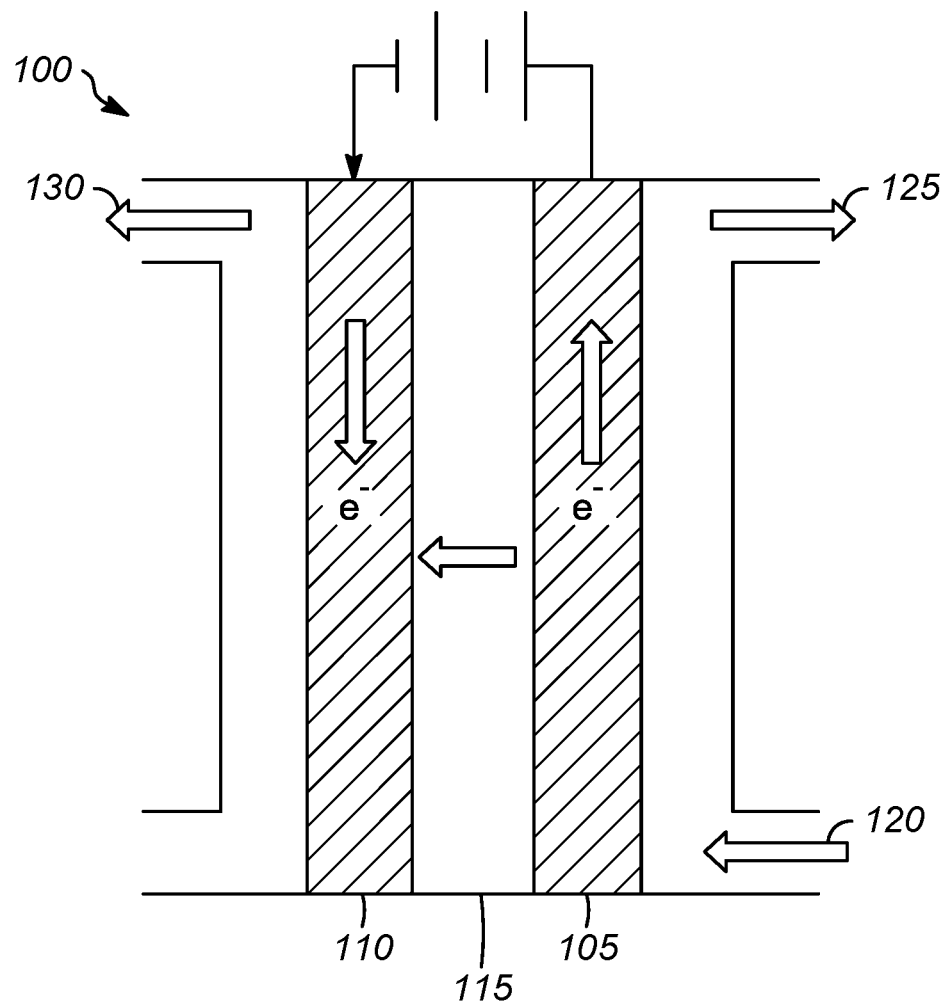
FIG. 1 is an illustration of one embodiment of a PEMWE cell.
Figure 2:
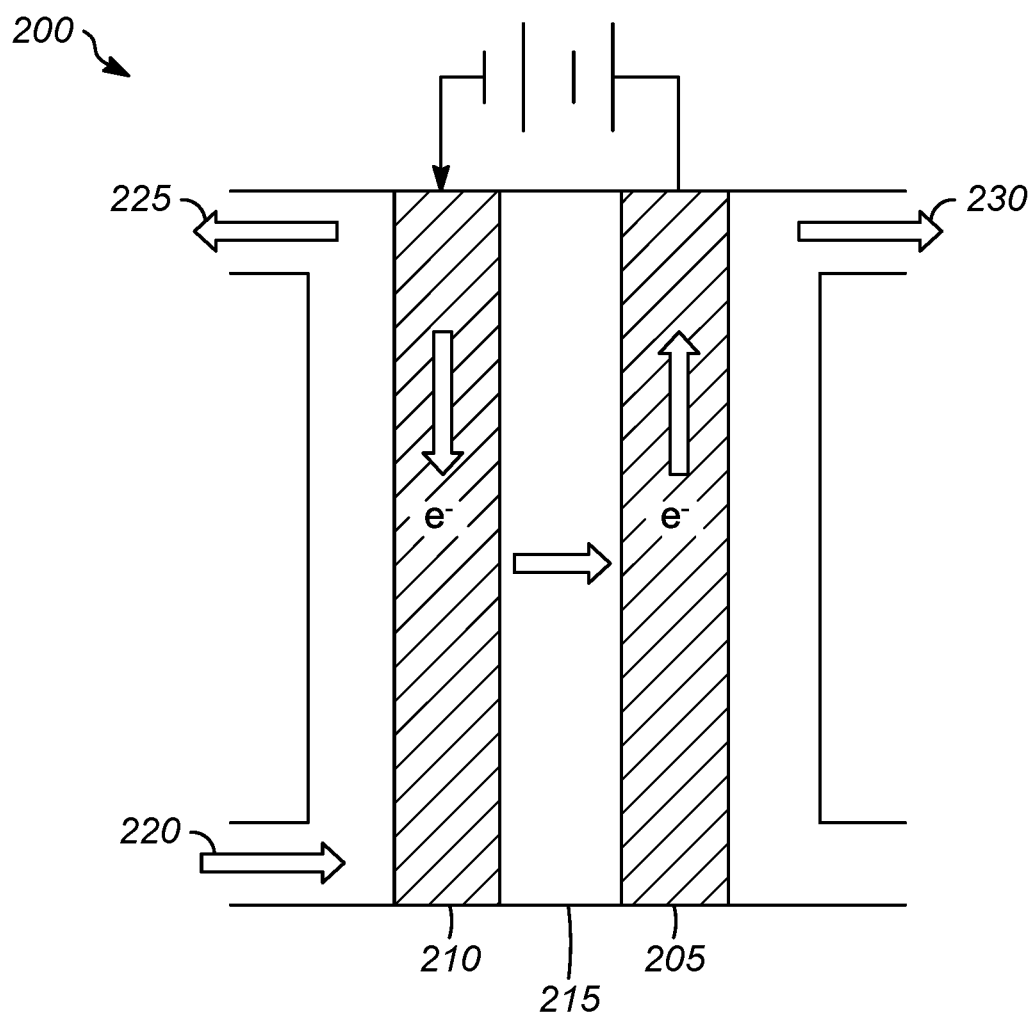
FIG. 2 is an illustration of one embodiment of a AEMWE cell.

A new polyelectrolyte multilayer coated proton-exchange membrane for electrolysis and fuel cell applications has been developed for electrolysis and fuel cell applications. The new polyelectrolyte multilayer coated proton-exchange membrane has low membrane area specific resistance and significantly reduced H$_2$ and O$_2$ crossover, lower cost, and enhanced proton (H$^+$) conductivity compared to a commercially available membrane, such as a Nafion 115 membrane. The oppositely charged polyelectrolyte layers are alternately deposited on one or both surfaces of a cation exchange membrane.

The polyelectrolyte multilayer coated proton-exchange membrane comprises: a cation exchange membrane, and a polyelectrolyte multilayer coating on one or both surfaces of the cation exchange membrane. The polyelectrolyte multilayer coating comprises alternating layers of a polycation polymer and a polyanion polymer. The polycation polymer layer is deposited on and is in contact with the cation exchange membrane. There can be one, two, three, four, five, or more sets of alternating polycation polymer and polyanion polymer layers on one or both sides of the cation exchange membrane. The top layer of the polyelectrolyte multilayer coating can be either a polycation polymer layer or a polyanion polymer layer.

The polyelectrolyte multilayer coating may be formed using a layer-by-layer self-assembly method. The layer-by-layer self-assembly may be achieved by adsorption, electrostatic interactions, covalent bonds, hydrogen bonds, van der Waals forces, hydrophobic interactions, or combinations thereof, for example. The methods for the formation of polyelectrolyte multilayer coating via layer-by-layer self-assembly may be selected from, but are not limited to, dip coating, spray deposition, centrifugal deposition, electrodeposition, meniscus/slot die coating, brushing, roller coating, metering rod/Meyer bar coating, knife casting, and the like.

The choice of the fabrication method depends on the polycation and polyanion to be assembled, the time required for the layer-by-layer self-assembly, and the shape of the cation exchange membrane that the polyelectrolyte multilayer coating will be deposited on. The first polyelectrolyte layer is formed by the adsorption (for example) of a polycation or polyanion on one or both surfaces of the cation exchange membrane possessing opposite charges. Subsequently, the second layer of the polyelectrolyte with charges opposite from the first layer of the polyelectrolyte is deposited on the first layer of the polyelectrolyte to form one set of alternating layers on the cation exchange membrane. A nanostructured polyelectrolyte multilayer coating with n sets of alternating layers on one or both surfaces of the cation exchange membrane results in a new proton-exchange membrane of cation exchange membrane/(polycation-polyanion)$_n$ or (polyanion-polycation)$_n$/cation exchange membrane/(polycation-polyanion)$_n$, respectively. The increase in polyelectrolyte multilayer thickness depends on the number of layers deposited and can be either linear or non-linear. Several parameters, such as ionic strength, pH, temperature, polyelectrolyte structure, concentration, and charge density, can be adjusted during the layer-by-layer self-assembly process. The oppositely changed polyelectrolyte layers are deposited on the surface of the cation exchange membrane. The polyelectrolyte multilayers are insoluble and thermally and chemically stable.

Figure 3:
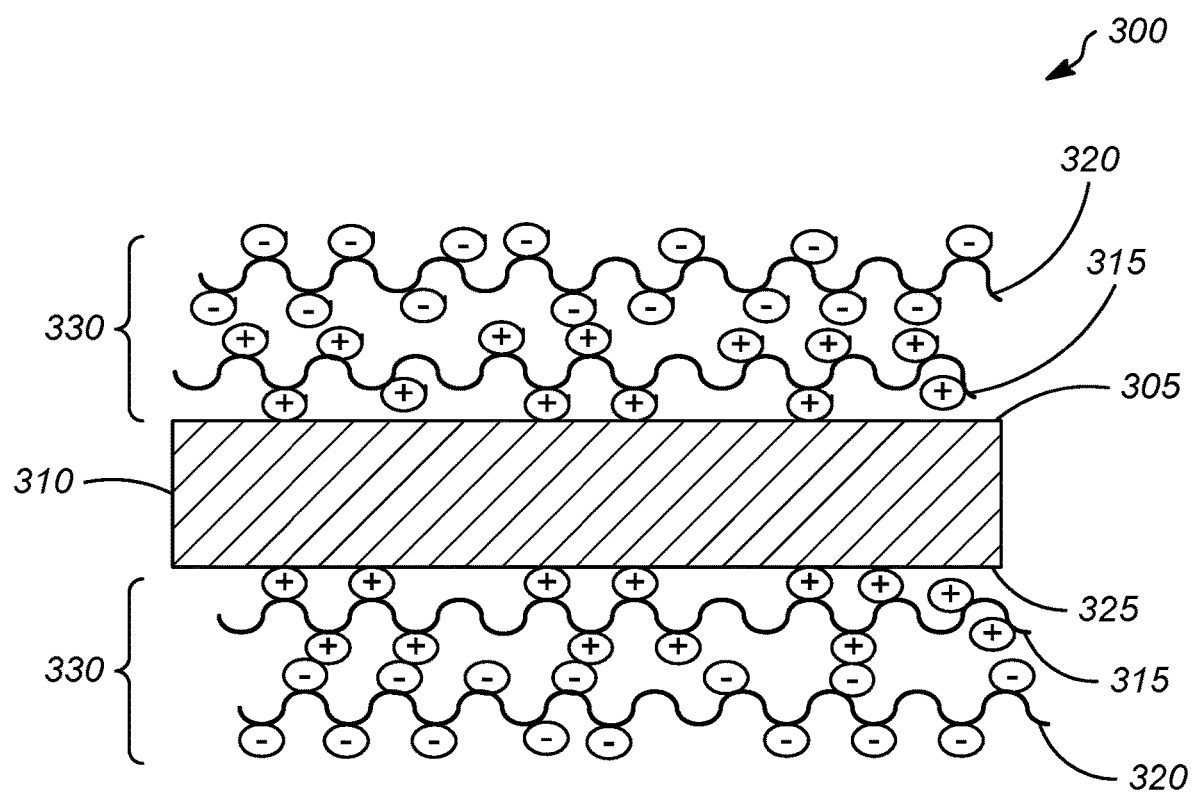
FIG. 3 is an illustration of one embodiment of the polyelectrolyte multilayer coated proton-exchange membrane of the present invention.

FIG. 3 is an illustration of the polyelectrolyte multilayer coated proton-exchange membrane 300. On the surface 305 of the cation exchange membrane 310, there is a polyeletrolyte multilayer coating 330. The polyeletrolyte multilayer coating 330 comprises alternating layers of a polycation polymer 315 and a polyanion polymer 320. There may be a second polyeletrolyte multilayer coating 330 comprising alternating layers of a polycation polymer 315 and a polyanion polymer 320 on the opposite surface 325 of the cation exchange membrane 110.

The polyanion polymer in the polyelectrolyte multilayer coating may be different from the cation exchange polymer in the cation exchange membrane.

The cation exchange membrane comprises a cation exchange polymer or a mixture of a cation exchange polymer and an inorganic filler comprising covalently bonded acidic functional groups. The cation exchange membrane in the new polyelectrolyte multilayer improved proton-exchange membrane comprises —SO$_3^-$, —COO$^-$, —PO$_3^{2-}$—, or —PO$_3$H$^-$ cation exchange functional groups with negative ionic charges. The cation exchange polymer in the cation exchange membrane may be selected from, but is not limited to, a perfluorinated ionomer such as Nafion®, Flemion®, Fumion®, Aciplex®, Aquivion®, Fumapem® FS, BAM®, or NEOSEPTA®-F, a cross-linked perfluorinated cation-exchange polymer, a partially fluorinated polymer, a cross-linked partially fluorinated cation-exchange polymer, a non-fluorinated hydrocarbon polymer, a cross-linked non-fluorinated hydrocarbon cation-exchange polymer, or combinations thereof. The cation exchange membrane has high mechanical strength, good chemical and thermal stability, and good proton conductivity. However, the cation exchange membrane typically has high cost, high area specific resistance, and high H$_2$ and O$_2$ crossover when thinner membrane with lower cost and lower area specific resistance is used for electrolysis and fuel cell applications. The new polyelectrolyte multilayer improved proton-exchange membrane has low membrane area specific resistance, low swelling, significantly reduced H$_2$ and O$_2$ crossover, and enhanced proton conductivity compared to the cation exchange membrane without the polyelectrolyte multilayer coating.

The cation exchange membrane for the preparation of the polyelectrolyte multilayer cation exchange membrane maybe the composite proton conductive membrane described in U.S. patent application Ser. No. 17/162,421, filed on Jan. 29, 2021, entitled Composite Proton Conductive Membranes, which is incorporated herein by reference in its entirety. That application disclosed a new type of composite proton conductive membrane comprising an inorganic filler having covalently bonded acidic functional groups and a high surface area of at least 150 m$^2$/g, and a water insoluble ionically conductive polymer. The deposition of the polyelectrolyte multilayer coating on the composite proton conductive membrane resulted in reduced membrane swelling, significantly reduced H$_2$ and O$_2$ crossover, and enhanced proton conductivity compared to the composite proton conductive membrane without the polyelectrolyte multilayer coating.

The inorganic filler comprising covalently bonded acidic functional groups in the cation exchange membrane may be selected from, but is not limited to, silica gel, precipitated silica, fumed silica, colloidal silica, alumina, silica-alumina, zirconium oxide, molecular sieve, metal-organic framework, zeolitic imidazolate framework, covalent organic framework, or a combination thereof, and wherein the filler may comprise both covalently bonded acidic functional groups and a high surface area of 150 m$^2$/g or higher, or 300 m$^2$/g or higher, or 400 m$^2$/g or higher. Molecular sieves have framework structures which may be characterized by distinctive wide-angle X-ray diffraction patterns. Zeolites are a subclass of molecular sieves based on an aluminosilicate composition. Non-zeolitic molecular sieves are based on other compositions such as aluminophosphates, silico-aluminophosphates, and silica. Molecular sieves can have different chemical compositions and different framework structure. The molecular sieves can be microporous or mesoporous molecular sieves and need to be stable in aqueous solution under pH of less than 6. The acidic functional groups covalently bonded to the inorganic fillers may be selected from, but are not limited to, —H$_2$PO$_3$, —R—H$_2$PO$_3$, —SO$_3$H, —R—SO$_3$H, —COOH, —R—COOH, —C$_6$H$_5$OH, —R—C$_6$H$_5$OH, or a combination thereof, wherein R represents a linear alkyl group, a branched alkyl group, a cycloalkyl group, an organoamino group, an acid group-substituted organoamino group, or an aryl group and the number of carbon atoms in these groups is preferably 1 to 20, more preferably 1 to 10. The inorganic fillers may be in the form of, but are not limited to, particles, fine beads, thin plates, rods, or fibers. The size of the inorganic filler is in a range of about 2 nm to about 200 μm, or in a range of about 10 nm to about 100 μm, or in a range of about 50 nm to about 80 μm. In some embodiments, the inorganic filler is aminopropyl-N,N-bis(methyl phosphonic acid)-functionalized silica gel such as SilicaMetS® AMPA, aminopropyl-N,N-bis(methyl phosphonic acid)-functionalized fumed silica, n-propyl phosphonic acid-functionalized silica gel, n-propyl phosphonic acid-functionalized fumed silica, p-toluenesulfonic acid-functionalized silica gel, p-toluenesulfonic acid-functionalized fumed silica, 4-ethylbenzenesulfonic acid-functionalized silica gel such as SilicaBond® Tosic Acid, 4-ethylbenzenesulfonic acid-functionalized fumed silica, n-propyl sulfonic acid-functionalized silica gel, n-propyl sulfonic acid-functionalized fumed silica, or combinations thereof.

Suitable cation exchange polymers include, but are not limited to, a perfluorinated sulfonic acid-based polymer, a perfluorinated carboxylic acid polymer, a sulfonated aromatic hydrocarbon polymer, a cross-linked sulfonated aromatic hydrocarbon polymer, or combinations thereof. Suitable cation exchange polymers include, but are not limited to, a copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, a copolymer of perfluoro-3-oxa-4-pentene-sulfonic acid and 2,2,4-trifluoro-5-trifluoromethoxy-1,3-dioxole, sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, cross-linked sulfonated poly(vinyl toluene), or combinations thereof.

The first layer deposited on one or both surfaces of the cation exchange membrane possessing negative ionic charges should be a polycation polymer layer having positive ionic charges, opposite from those on the cation exchange membrane, which leads to the formation of a stable coating as the first part of the first polyelectrolyte bilayer via electrostatic interactions between the cation exchange polymer of the cation exchange membrane and the polycation deposited on the surface of the cation exchange membrane. A polyanion polymer with opposite charges is then deposited on the surface of the first polycation polymer coating layer via electrostatic interactions to form the second part of the first polyelectrolyte bilayer. Polyelectrolyte multilayers of either cation exchange membrane/(polycation-polyanion)$_n$ or polyanion-polycation)$_n$/cation exchange membrane/(polycation-polyanion)$_n$ can be formed following the same alternating deposition process. The thickness of each layer of the polyanion or polycation is less than 50 nm, or less than 20 nm, or less than 10 nm, or less than 5 nm. The polyanion polymer in the polyelectrolyte multilayers has negative charges and can be the same or different from the cation exchange polymer in the cation exchange membrane, but the polyanion polymer cannot be the first polyelectrolyte layer deposited on the surface of the cation exchange membrane having negative charges. The polyanion polymer suitable for the preparation of the polyelectrolyte multilayer coated proton-exchange membrane has similar or higher proton conductivity than the cation exchange membrane and has similar or lower $H_2$ and $O_2$ permeabilities than the cation exchange membrane. However, the polyanion polymer and the polycation polymer may be soluble in aqueous solutions, which makes the membranes prepared from either the polyanion polymer or polyanion polymer unsuitable for water electrolysis or fuel cell applications. The polyelectrolyte multilayers deposited on one or both surfaces of the cation exchange membrane via layer-by-layer self-assembly are not only insoluble and thermally and chemically stable, but also have significantly reduced swelling and $H_2$ and $O_2$ crossover of the cation exchange membrane, and enhanced proton conductivity compared to the cation exchange membrane for water electrolysis or fuel cell applications.

The polycation polymers suitable for the preparation of the polyelectrolyte multilayer coated proton-exchange membrane include, but are not limited to protonated chitosan; an amine based linear, hyperbranched, or dendritic polycation polymer selected from the group consisting of polybiguanide, quaternary ammonium polyethylenimine, quaternary ammonium polypropylenimine, quaternary ammonium polyamidoamine (PAMAM), poly(vinylamine hydrochloride) (PVH), poly(allylamine hydrochloride) (PAH), poly(amidoamine hydrochloride), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(2-vinylpiperidine hydrochloride), poly(4-vinylpiperidine hydrochloride), poly(diallyldimethylammonium chloride), poly(acrylamide-co-diallyldimethylammonium chloride), poly(diallyl methyl amine hydrochloride), a copolymer of 2-propen-1-amine-hydrochloride with N-2-propenyl-2-propen-1-aminehydrochloride, poly(N-alkyl-4-vinylpyridinium) salt, polylysine, polyornithine, polyarginine, poly(ethylene oxide)-block-poly(vinyl benzyl trimethylammonium chloride), poly(ethylene oxide)-block-poly(1-lysine), poly(2-methacryloyloxyethyl phosphorylcholine methacrylate)-block-poly(vinyl benzyl trimethylammonium chloride), poly[2-(dimethylamino)-ethyl methacrylate, poly[3-(dimethylamino)-propyl methacrylate], poly[2-(dimethylamino)-ethyl methacrylamide], poly[3-(dimethylamino) propyl methacrylamide], poly[2-(trimethylamino)ethyl methacrylate chloride], poly[2-(diethylamino)ethyl methacrylate], poly[2-(dimethylamino) ethyl acrylate]; or combinations thereof.

The polyanion polymers suitable for the preparation of the polyelectrolyte multilayer coated proton-exchange membrane include but, are not limited to, a sulfonated hydrocarbon polymer, poly(acrylic acid), poly(sodium phosphate), or a negatively charged polysaccharide polyanion polymer, or combinations thereof. Suitable sulfonated hydrocarbon polymers include, but are not limited to, sulfonated poly(ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly(vinylsulfonic acid sodium), poly(sodium phosphate), or combinations thereof. Suitable negatively charged polysaccharide polyanion polymers include, but are not limited to, sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, τ-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, or combinations thereof.

Another aspect of the invention is a method of making the new polyelectrolyte multilayer coated proton-exchange membrane. In one embodiment, the method comprises applying a polyelectrolyte multilayer coating to a surface of a cation exchange membrane, the polyelectrolyte multilayer coating comprising alternating layers of a polycation polymer and a polyanion polymer to form the polyelectrolyte multilayer coated proton-exchange membrane, wherein the polycation polymer layer is in contact with the cation exchange membrane; and optionally treating the polyelectrolyte multilayer coated proton-exchange in an acidic solution.

The method may include applying a polyelectrolyte multilayer coating to a second surface of the cation exchange membrane.

The cation exchange polymers, the polycation polymers, and the polyanion polymers may be the same polymers described above.

EXAMPLES

The following examples are provided to illustrate one or more preferred embodiments of the invention but are not limited embodiments thereof. Numerous variations can be made to the following examples that lie within the scope of the invention.

Example 1. Preparation of n Sets of Poly(Allylamine Hydrochloride) (PAH) and Sulfonated Poly (Ether Ether Ketone) (SPEEK) Polyelectrolyte Multilayer-Coated Nafion® 212 Membranes (Abbreviated as (SPEEK-PAH)$_n$/Nafion®-212/ (PAH-SPEEK)$_n$)

A poly(allylamine hydrochloride) (PAH) and sulfonated poly(ether ether ketone) (SPEEK) polyelectrolyte multilayer-coated Nafion® 212 membrane was prepared as the following: Nafion® 212 membrane was soaked in a 3 wt % $H_2O_2$ aqueous solution at 90° C. for 3 h, and then in 0.5M $H_2SO_4$ at 90° C. for 3 h, and finally in deionized (DI) $H_2O$ at room temperature for 24 h before polyelectrolyte multilayer coating.

A poly(allylamine hydrochloride) (PAH) polycation solution with 1M NaCl and 0.02M PAH was prepared by dissolving NaCl and PAH in DI $H_2O$ and adjusting the pH to 2.3 using a 0.1M HCl aqueous solution.

A sulfonated poly(ether ether ketone) (SPEEK) polyanion was synthesized using poly(ether ether ketone) polymer (PEEK, Polysciences) and 95-98 wt % sulfuric acid ($H_2SO_4$, Fisher Chemical). 20.0 g of PEEK was gradually added to 180 mL of $H_2SO_4$ in a three-necked round-bottomed flask with a mechanical stirrer and a condenser. The PEEK and $H_2SO_4$ mixture were stirred for 24 h at room temperature and then vigorously stirred for an additional 24 h at 60° C. The PEEK was fully dissolved to form a dark red and viscous solution after the conversion of PEEK to SPEEK. The SPEEK was precipitated in ice water. SPEEK was filtered and then soaked in DI $H_2O$ overnight and washed with DI $H_2O$ for 3-5 times. The purified SPEEK was dried at room temperature overnight and then further dried at 100° C. for 24 h to produce dried SPEEK polymer.

A SPEEK polyanion aqueous solution with 0.5M NaCl and 0.02M SPEEK was prepared by dissolving the NaCl and SPEEK in DI $H_2O$ at 100° C. After cooling down to room temperature, the solution was filtrated, and the pH was adjusted to 5.8.

The KOH treated and DI $H_2O$ washed Nafion® 212 membrane was immersed in the PAH polycation solution for 5 min. Then, the membrane was rinsed with DI $H_2O$ 3 times. The membrane was then immersed in the SPEEK polyanion solution for 5 min. Then, the membrane was rinsed with DI $H_2O$ 3 times and one PAH/SPEEK polyelectrolyte bilayer was deposited on both surfaces of the Nafion® 212 membrane. This process was repeated until the desired numbers of polyelectrolyte layers were deposited. The top layer can be either PAH polycation or SPEEK polyanion.

As an example, (SPEEK-PAH)$_3$/Nafion®-212/(PAH-SPEEK)$_3$ membrane was prepared by depositing 3 sets of PAH/SPEEK polyelectrolyte bilayers on both surfaces of the Nafion® 212 membrane.

As another example, (SPEEK-PAH)$_8$/Nafion®-212/(PAH-SPEEK)$_8$ membrane was prepared by depositing 8 sets of PAH/SPEEK polyelectrolyte bilayers on both surfaces of the Nafion® 212 membrane.

Example 2. Evaluation of the Proton Conductivity of (SPEEK-PAH)$_3$/Nafion®-212/(PAH-SPEEK)$_3$ and (SPEEK-PAH)$_8$/Nafion®-212/(PAH-SPEEK)$_8$ Membranes The in-plane proton conductivities of (SPEEK-PAH)$_3$/Nafion®-212/(PAH-SPEEK)$_3$, (SPEEK-PAH)$_8$/Nafion®-212/(PAH-SPEEK)$_8$, and Nafion® 212 membranes were measured using the a.c. impedance on a three-electrode cell with platinum electrodes. The membranes were soaked 0.1 M HCl for 24 h at room temperature, and then soaked in DI $H_2O$ for 24 h at room temperature before the measurement. The measurement cell was submerged in DI $H_2O$ at room temperature. Impedance measurements were carried out at open circuit over a frequency range of 10-100 kHz, with a Gamry Reference 600+ potentiostat/galvanostat.

(SPEEK-PAH)$_3$/Nafion®-212/(PAH-SPEEK)$_3$ membrane showed a higher $H^+$ conductivity of 119 mS/cm than Nafion® 212 membrane with a $H^+$ conductivity of 75 mS/cm. (SPEEK-PAH)$_8$/Nafion®-212/(PAH-SPEEK)$_8$ membrane also showed a higher $H^+$ conductivity of 124 mS/cm than Nafion® 212 membrane. These results demonstrated that the deposition of PAH-SPEEK polyelectrolyte multilayers on Nafion® 212 membrane enhanced the membrane $H^+$ conductivity.

Example 3. Evaluation of $H_2$ Fluxes of (SPEEK-PAH)$_3$/Nafion®-212/(PAH-SPEEK)$_3$, (SPEEK-PAH)$_8$/Nafion®-212/(PAH-SPEEK)$_8$, Nafion® 212, and Nafion® 115 Membranes The $H_2$ flux of (SPEEK-PAH)$_3$/Nafion®-212/(PAH-SPEEK)$_3$, (SPEEK-PAH)$_8$/Nafion®-212/(PAH-SPEEK)$_8$, Nafion® 212, and Nafion® 115 membranes were measured by a gas permeation unit. The membrane was loaded into a stainless-steel circular permeation cell inside a temperature-controlled oven. The effective area of the testing cell was 19.61 cm$^2$. Pure $H_2$ feed gas was fully saturated with water vapor by bubbling through stainless-steel humidifiers inside the temperature-controlled oven. The oven temperature was controlled at 50° C. The flow rate of the permeate $H_2$ gas was measured using an ADM flowmeter (Agilent Technologies).

(SPEEK-PAH)$_3$/Nafion®-212/(PAH-SPEEK)$_3$ membrane showed a lower $H_2$ flux of 0.23 mmol/cm$^2$/sec than Nafion® 212 with a $H_2$ flux of 1.04 mmol/cm$^2$/sec and Nafion® 117 membrane with a $H_2$ flux of 0.33 mmol/cm$^2$/sec. (SPEEK-PAH)$_8$/Nafion®-212/(PAH-SPEEK)$_8$ membrane also showed a lower $H_2$ flux of 0.17 mmol/cm$^2$/sec than Nafion® 212 with a $H_2$ flux of 1.04 mmol/cm$^2$/sec and Nafion® 117 membrane with a $H_2$ flux of 0.33 mmol/cm$^2$/sec under 400 psig $H_2$ feed pressure. These results demonstrated that the deposition of PAH-SPEEK polyelectrolyte multilayers on Nafion® 212 membrane effectively reduced the membrane $H_2$ flux, indicating that the PAH-SPEEK polyelectrolyte multilayer-coated Nafion® 212 membrane will have lower $H_2$ and $O_2$ crossover for electrolysis and fuel cell applications.

Example 4. Preparation of PAH and SPEEK Polyelectrolyte Multilayer-Coated Nafion® 115 Membrane (Abbreviated as (SPEEK-PAH)$_3$/Nafion®-115/(PAH-SPEEK)$_3$)

PAH and SPEEK polyelectrolyte multilayer-coated Nafion® 115 membrane (abbreviated as (SPEEK-PAH)$_3$/Nafion®-115/(PAH-SPEEK)$_3$) was prepared using a procedure same as that for (SPEEK-PAH)$_3$/Nafion®-212/(PAH-SPEEK)$_3$ as described in Example 1 except that Nafion® 115 instead of Nafion® 212 was used.

Example 5. Preparation of a Membrane Electrode Assembly (MEA) Comprising (SPEEK-PAH)$_3$/Nafion®-212/(PAH-SPEEK)$_3$ Membrane (Abbreviated as (SPEEK-PAH)$_3$/Nafion®-212/(PAH-SPEEK)$_3$ MEA) for Water Electrolysis A MEA comprising (SPEEK-PAH)$_3$/Nafion®-212/(PAH-SPEEK)$_3$ membrane was prepared by a catalyst coated on membrane (CCM) method using $IrO_2$ as an oxygen evolution reaction (OER) catalyst for the anode and Pt/C as a hydrogen evolution reaction (HER) catalyst for the cathode. Catalyst inks for spray coating were prepared by mixing the catalysts and Nafion® ionomer (5 wt % in alcohol) in DI water and alcohol. The mixture was finely dispersed using an ultrasonication bath. Nafion® ionomer contents in the anode and the cathode were controlled to about 10 wt % in the total content of the catalyst and Nafion® ionomer. The Pt/C ink was spray coated onto one side of the membrane. The Pt loading was about 0.3 mg/cm$^2$. $IrO_2$ ink was spray coated onto the other side of the membrane. $IrO_2$ loading was about 2.0 mg/cm$^2$. The MEA was sandwiched between a carbon paper (as a cathode gas diffusion layer) and a Pt—Ti-felt (as an anode gas diffusion layer). Then, the testing cell was installed using the (SPEEK-PAH)$_3$/Nafion®-212/(PAH-SPEEK)$_3$ membrane-based MEA with the gas diffusion layers.

Comparative Example 1: Preparation of a Membrane Electrode Assembly (MEA) Comprising Nafion® 212 Membrane for Water Electrolysis (Abbreviated as Nafion® 212 MEA)

A Nafion® 212 MEA comprising Nafion® 212 membrane was prepared using the catalyst coated on membrane (CCM) method same as that used in Example 5 except that Nafion® 212 membrane was used.

Comparative Example 2: Preparation of a Membrane Electrode Assembly (MEA) Comprising Nafion® 115 Membrane for Water Electrolysis (Abbreviated as Nafion® 115 MEA)

A Nafion® 115 MEA comprising Nafion® 115 membrane was prepared using the catalyst coated on membrane (CCM) method same as that used in Example 5 except that Nafion® 115 membrane was used.

Example 6: Water Electrolysis Performance of (SPEEK-PAH)$_3$/Nafion®-212/(PAH-SPEEK)$_3$, Nafion® 212, and Nafion® 115 MEAs A proton exchange membrane (PEM) water electrolysis test station (Scribner 600 electrolyzer test system) was used to evaluate the water electrolysis performance of (SPEEK-PAH)$_3$/Nafion®-212/(PAH-SPEEK)$_3$, Nafion® 212, and Nafion® 115 MEAs in a single electrolyzer cell with an active membrane area of 5 cm$^2$. The test station included an integrated power supply, a potentiostat, an impedance analyzer for electrochemical impedance spectroscopy (EIS) and high-frequency resistance (HFR), and real-time sensors for product flow rate and cross-over monitoring. The testing was conducted at 80-100° C. and at atmospheric pressure. Ultrapure water was supplied to the anode of the MEA with a flow rate of 100 mL/min. The cell went through a pre-conditioning process before the testing. The cell was heated to 60° C. and held for 1 h at 200 mA/cm$^2$, 1 h at 1 A/cm$^2$, followed by 4 h at 1.7 V. The cell was then heated to 80° C. and held for 1 h at 200 mA/cm$^2$ and 1 h at 1 A/cm$^2$. These steps were counted together as one conditioning cycle. After the conditioning, the polarization curve was prepared (each datapoint end of 1 min hold). After two conditioning cycles, the polarization results are shown in FIGS. 4 and 5.

Figure 4:
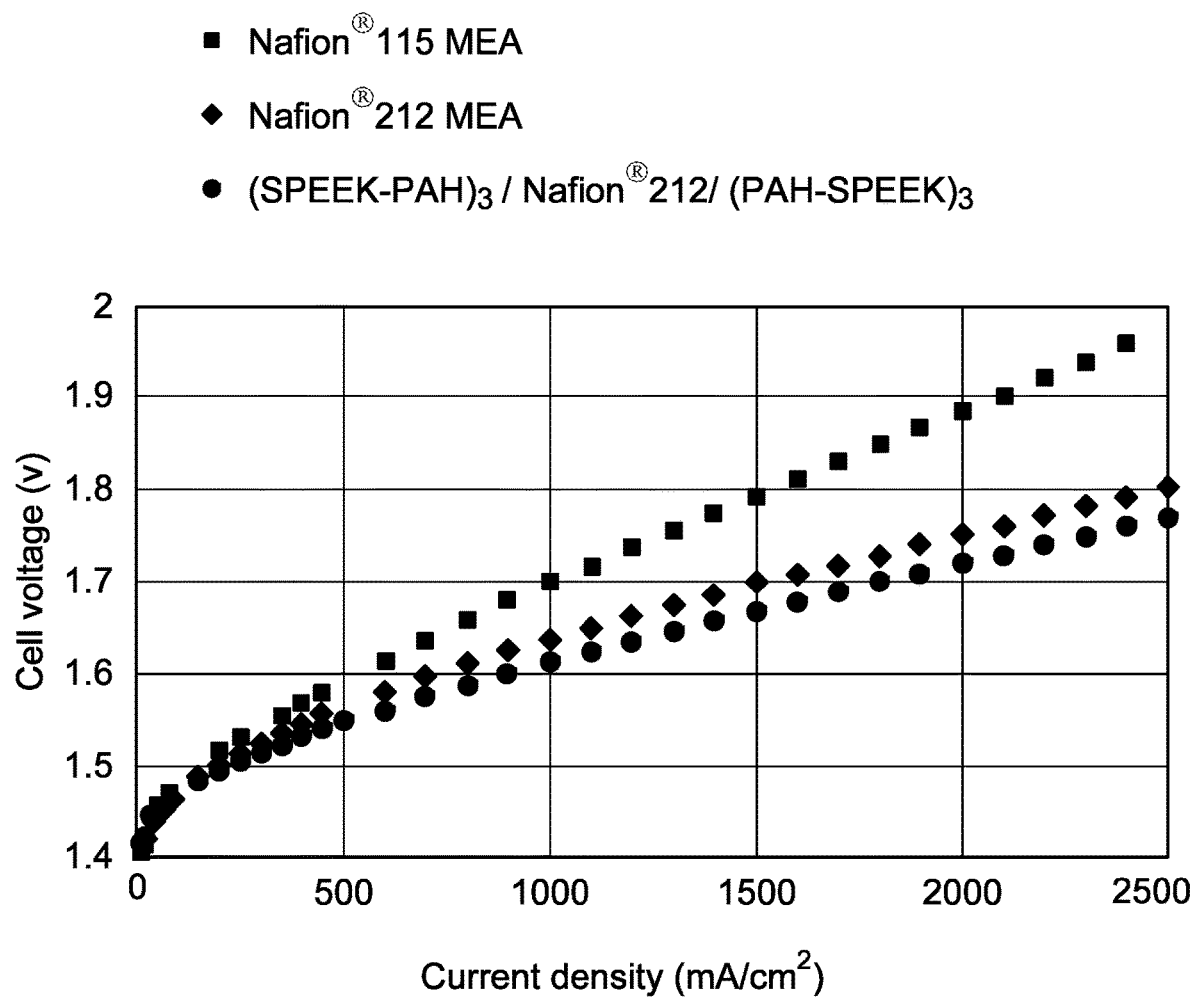
FIG. 4 shows the polarization curves of single water electrolysis cell comprising (SPEEK-PAH)$_3$/Nafion®-212/ (PAH-SPEEK)$_3$, Nafion® 212, and Nafion® 115 MEAs, respectively, at 80° C., atmospheric pressure.
Figure 5:
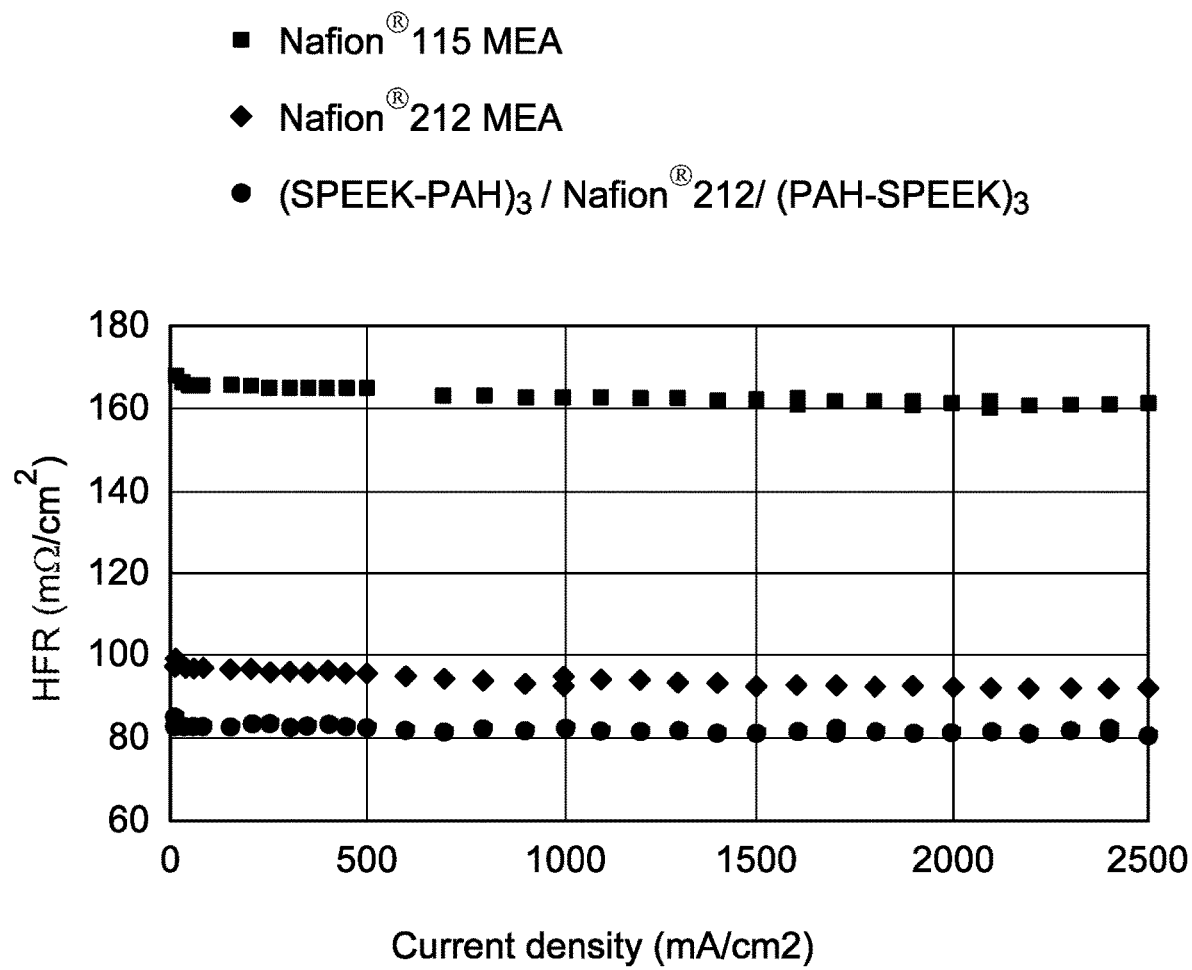
FIG. 5 shows the plots of high-frequency resistance (HFR) over current density for (SPEEK-PAH)$_3$/Nafion®-212/(PAH-SPEEK)$_3$, Nafion® 212, and Nafion® 115 MEAs, respectively, at 80° C., atmospheric pressure.

It can be seen that from FIGS. 4 and 5 that (SPEEK-PAH)$_3$/Nafion®-212/(PAH-SPEEK)$_3$ MEA showed lower cell voltage and lower frequency resistance (HFR) than Nafion® 212 MEA and Nafion® 115 MEA when the current density is about 500 mA/cm$^2$ or higher, indicating that (SPEEK-PAH)$_3$/Nafion®-212/(PAH-SPEEK)$_3$ MEA comprising the (SPEEK-PAH)$_3$/Nafion®/(PAH-SPEEK)$_3$ membrane has higher proton conductivity than Nafion® 212 MEA comprising the commercial Nafion® 212 membrane and Nafion® 115 MEA comprising the commercial Nafion® 115 membrane.

Figure 6:
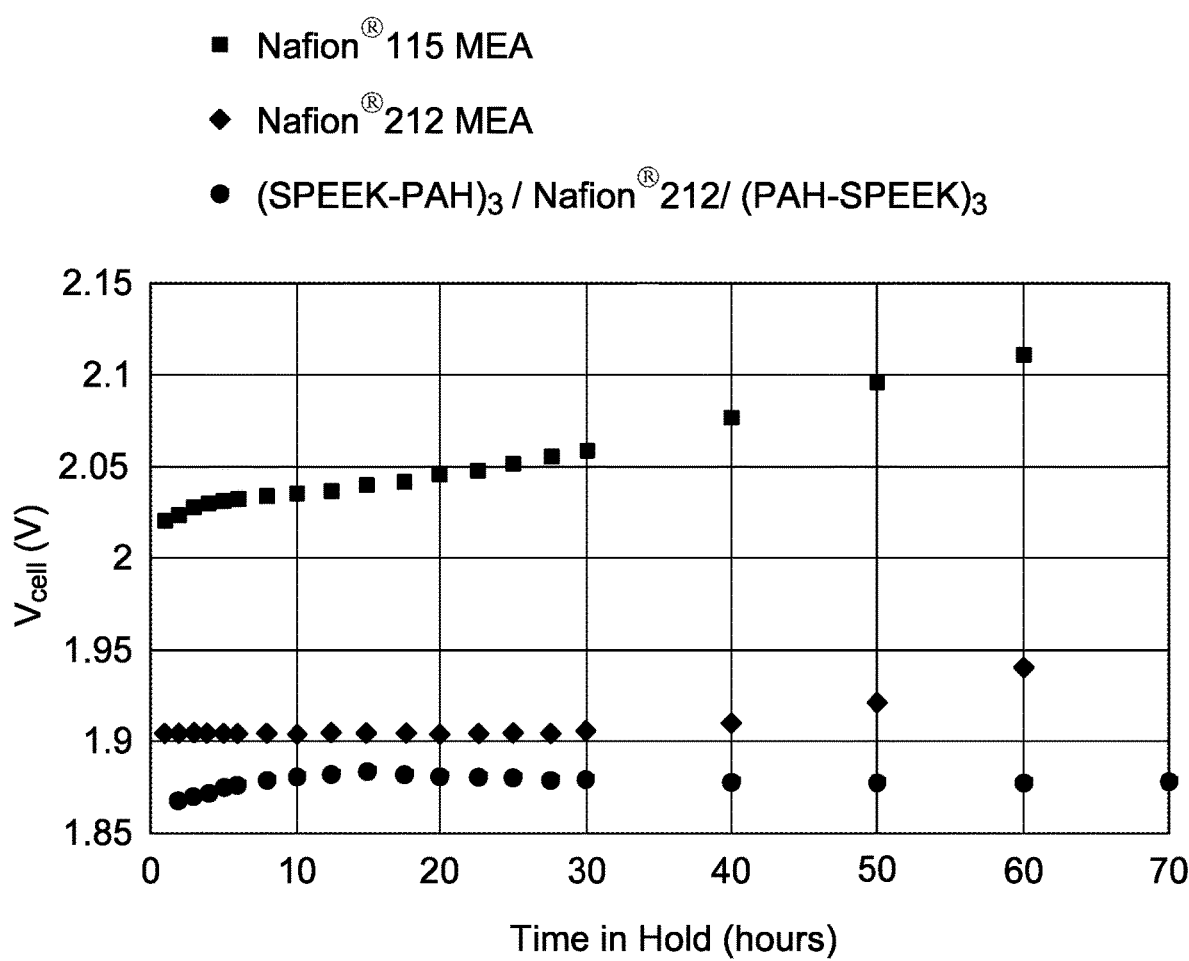
FIG. 6 shows the cell voltage change with time for (SPEEK-PAH)$_3$/Nafion®-212/(PAH-SPEEK)$_3$, Nafion® 212, and Nafion® 115 MEAs in water electrolysis at 90° C. and 3.9 A/cm$^2$.

The stability of (SPEEK-PAH)$_3$/Nafion®-212/(PAH-SPEEK)$_3$, Nafion® 212, and Nafion® 115 MEAs was tested at 90° C. and 3.9 A/cm$^2$. As shown in FIG. 6, MEA with (SPEEK-PAH)$_3$/Nafion®-212/(PAH-SPEEK)$_3$ membrane showed higher stability without significant cell voltage increase with time than Nafion® 212 and Nafion® 115 MEAs.

SPECIFIC EMBODIMENTS

While the following is described in conjunction with specific embodiments, it will be understood that this description is intended to illustrate and not limit the scope of the preceding description and the appended claims.

A first embodiment of the invention is a polyelectrolyte multilayer coated proton-exchange membrane comprising a cation exchange membrane; and a polyelectrolyte multilayer coating on a surface of the cation exchange membrane, the polyelectrolyte multilayer coating comprising alternating layers of a polycation polymer and a polyanion polymer, and wherein the polycation polymer layer is in contact with the cation exchange membrane. An embodiment of the invention is one, any or all of prior embodiments in this paragraph up through the first embodiment in this paragraph wherein there is a polyelectrolyte multilayer coating on both surfaces of the cation exchange membrane. An embodiment of the invention is one, any or all of prior embodiments in this paragraph up through the first embodiment in this paragraph wherein there are at least two sets of alternating layers of the polycation polymer and the polyanion polymer on the surface of the cation exchange membrane. An embodiment of the invention is one, any or all of prior embodiments in this paragraph up through the first embodiment in this paragraph wherein the cation exchange membrane comprises a cation exchange polymer or a mixture of a cation exchange polymer and an inorganic filler comprising covalently bonded acidic functional groups. An embodiment of the invention is one, any or all of prior embodiments in this paragraph up through the first embodiment in this paragraph wherein the cation exchange polymer comprises a perfluorinated sulfonic acid-based polymer, a perfluorinated carboxylic acid polymer, a sulfonated aromatic hydrocarbon polymer, a cross-linked sulfonated aromatic hydrocarbon polymer, or combinations thereof. An embodiment of the invention is one, any or all of prior embodiments in this paragraph up through the first embodiment in this paragraph wherein the cation exchange polymer comprises a copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, a copolymer of perfluoro-3-oxa-4-pentene-sulfonic acid and 2,2,4-trifluoro-5-trifluoromethoxy-1,3-dioxole, sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, cross-linked sulfonated polyphenyl sulfone, crosslinked poly(phenylene sulfide sulfone nitrile), sulfonated polystyrene, sulfonated poly(vinyl toluene), cross-linked sulfonated polystyrene, cross-linked sulfonated poly(vinyl toluene), or combinations thereof. An embodiment of the invention is one, any or all of prior embodiments in this paragraph up through the first embodiment in this paragraph wherein the polycation polymer comprises an amine based polycation polymer, a positively charged polysaccharide polycation polymer, or combinations thereof. An embodiment of the invention is one, any or all of prior embodiments in this paragraph up through the first embodiment in this paragraph wherein the polycation polymer comprises protonated chitosan; an amine based linear, hyperbranched, or dendritic polycation polymer selected from the group consisting of polybiguanide, quaternary ammonium polyethylenimine, quaternary ammonium polypropylenimine, quaternary ammonium polyamidoamine (PAMAM), poly(vinylamine hydrochloride) (PVH), poly(allylamine hydrochloride) (PAH), poly(amidoamine hydrochloride), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(2-vinylpiperidine hydrochloride), poly(4-vinylpiperidine hydrochloride), poly(diallyldimethylammonium chloride), poly(acrylamide-co-diallyldimethylammonium chloride), poly(diallyl methyl amine hydrochloride), a copolymer of 2-propen-1-amine-hydrochloride with N-2-propenyl-2-propen-1-aminehydrochloride, poly(N-alkyl-4-vinylpyridinium) salt, polylysine, polyornithine, polyarginine, poly(ethylene oxide)-block-poly(vinyl benzyl trimethylammonium chloride), poly(ethylene oxide)-block-poly(1-lysine), poly(2-methacryloyloxyethyl phosphorylcholine methacrylate)-block-poly(vinyl benzyl trimethylammonium chloride), poly[2-(dimethylamino)-ethyl methacrylate, poly[3-(dimethylamino)-propyl methacrylate], poly[2-(dimethylamino)-ethyl methacrylamide], poly[3-(dimethylamino) propyl methacrylamide], poly[2-(trimethylamino)ethyl methacrylate chloride], poly[2-(diethylamino)ethyl methacrylate], poly[2-(dimethylamino)ethyl acrylate]; or combinations thereof. An embodiment of the invention is one, any or all of prior embodiments in this paragraph up through the first embodiment in this paragraph wherein the polyanion polymer comprises sulfonated poly(ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly(vinylsulfonic acid sodium), poly(sodium phosphate), a negatively charged polysaccharide polyanion polymer selected from the group consisting of sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, τ-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, pectic acid, or combinations thereof. An embodiment of the invention is one, any or all of prior embodiments in this paragraph up through the first embodiment in this paragraph wherein the polyanion polymer is different from a cation exchange polymer of the cation exchange membrane.

A second embodiment of the invention is a method of preparing polyelectrolyte multilayer coated proton-exchange membrane comprising applying a polyelectrolyte multilayer coating to a surface of a cation exchange membrane, the polyelectrolyte multilayer coating comprising alternating layers of a polycation polymer and a polyanion polymer to form the polyelectrolyte multilayer coated proton-exchange membrane, wherein the polycation polymer layer is in contact with the cation exchange membrane; and optionally treating the polyelectrolyte multilayer coated proton-exchange membrane in an acidic solution. An embodiment of the invention is one, any or all of prior embodiments in this paragraph up through the second embodiment in this paragraph further comprising applying a polyelectrolyte multilayer coating to a second surface of the cation exchange membrane. An embodiment of the invention is one, any or all of prior embodiments in this paragraph up through the second embodiment in this paragraph wherein there are at least two sets of alternating layers of the polycation polymer and the polyanion polymer on the surface of the cation exchange membrane. An embodiment of the invention is one, any or all of prior embodiments in this paragraph up through the second embodiment in this paragraph wherein the cation exchange membrane comprises a cation exchange polymer or a mixture of a cation exchange polymer and an inorganic filler comprising covalently bonded acidic functional groups. An embodiment of the invention is one, any or all of prior embodiments in this paragraph up through the second embodiment in this paragraph wherein the cation exchange polymer comprises a perfluorinated sulfonic acid-based polymer, a perfluorinated carboxylic acid polymer, a sulfonated aromatic hydrocarbon polymer, a cross-linked sulfonated aromatic hydrocarbon polymer, or combinations thereof. An embodiment of the invention is one, any or all of prior embodiments in this paragraph up through the second embodiment in this paragraph wherein the cation exchange polymer comprises a copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro(2,2-dimethyl-1,3-dioxole), a copolymer of perfluoro-5-oxa-6-heptene-sulfonic acid and perfluoro(2,2-dimethyl-1,3-dioxole), a copolymer of perfluoro-4-oxa-5-hexene-sulfonic acid and perfluoro(2,2-dimethyl-1,3-dioxole), a copolymer of perfluoro-3-oxa-4-pentene-sulfonic acid and perfluoro(2,2-dimethyl-1,3-dioxole), a copolymer of perfluoro-3,6-dioxa-4-methyl-7-octene-sulfonic acid and perfluoro(2-methylene-4-methyl-1,3-dioxolane), a copolymer of perfluoro-5-oxa-6-heptene-sulfonic acid and perfluoro(2-methylene-4-methyl-1,3-dioxolane), a copolymer of perfluoro-4-oxa-5-hexene-sulfonic acid and perfluoro(2-methylene-4-methyl-1,3-dioxolane), a copolymer of perfluoro-3-oxa-4-pentene-sulfonic acid and perfluoro(2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexene-sulfonic acid and 2,2,4-trifluoro-5-trifluoromethoxy-1,3-dioxole, a copolymer of perfluoro-3-oxa-4-pentene-sulfonic acid and 2,2,4-trifluoro-5-trifluoromethoxy-1,3-dioxole, sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, cross-linked sulfonated polyether sulfone, crosslinked sulfonated polyphenyl sulfone, crosslinked poly(phenylene sulfide sulfone nitrile), sulfonated polystyrene, sulfonated poly(vinyl toluene), cross-linked sulfonated polystyrene, cross-linked sulfonated poly(vinyl toluene), or combinations thereof. An embodiment of the invention is one, any or all of prior embodiments in this paragraph up through the second embodiment in this paragraph wherein the polycation polymer comprises an amine based polycation polymer, a positively charged polysaccharide polycation polymer, or combinations thereof. An embodiment of the invention is one, any or all of prior embodiments in this paragraph up through the second embodiment in this paragraph wherein the polycation polymer comprises protonated chitosan; an amine based linear, hyperbranched, or dendritic polycation polymer selected from the group consisting of polybiguanide, quaternary ammonium polyethylenimine, quaternary ammonium polypropylenimine, quaternary ammonium polyamidoamine (PAMAM), poly(vinylamine hydrochloride) (PVH), poly(allylamine hydrochloride) (PAH), poly(amidoamine hydrochloride)), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(2-vinylpiperidine hydrochloride), poly(4-vinylpiperidine hydrochloride), poly(diallyldimethylammonium chloride), poly(acrylamide-co-diallyldimethylammonium chloride), poly(diallyl methyl amine hydrochloride), a copolymer of 2-propen-1-amine-hydrochloride with N-2-propenyl-2-propen-1-aminehydrochloride, poly(N-alkyl-4-vinylpyridinium) salt, polylysine, polyornithine, polyarginine, poly(ethylene oxide)-block-poly(vinyl benzyl trimethylammonium chloride), poly(ethylene oxide)-block-poly(1-lysine), poly(2-methacryloyloxyethyl phosphorylcholine methacrylate)-block-poly(vinyl benzyl trimethylammonium chloride), poly[2-(dimethylamino)-ethyl methacrylate, poly[3-(dimethylamino)-propyl methacrylate], poly[2-(dimethylamino)-ethyl methacrylamide], poly[3-(dimethylamino) propyl methacrylamide], poly[2-(trimethylamino)ethyl methacrylate chloride], poly[2-(diethylamino)ethyl methacrylate], poly[2-(dimethylamino) ethyl acrylate], or combinations thereof. An embodiment of the invention is one, any or all of prior embodiments in this paragraph up through the second embodiment in this paragraph wherein the polyanion polymer comprises a sulfonated hydrocarbon polymer selected from the group consisting of sulfonated poly(ether ether ketone), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), sulfonated polystyrene, sulfonated poly(vinyl toluene), poly(acrylic acid), poly(vinylsulfonic acid sodium), poly(sodium phosphate), a negatively charged polysaccharide polyanion polymer selected from the group consisting of sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, τ-carrageenan, pectin, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, pectic acid, or combinations thereof. An embodiment of the invention is one, any or all of prior embodiments in this paragraph up through the second embodiment in this paragraph wherein the polyanion polymer is different from the cation exchange polymer of the cation exchange membrane.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

What is claimed is:

1. A polyelectrolyte multilayer coated proton-exchange membrane for water electrolysis comprising:
    a cation exchange membrane comprising a cation exchange polymer or a mixture of a cation exchange polymer and an inorganic filler comprising covalently bonded acidic functional groups; and
    a polyelectrolyte multilayer coating on a surface of the cation exchange membrane, the polyelectrolyte multilayer coating comprising alternating layers of a polycation polymer layer comprising a polycation polymer and a polyanion polymer layer comprising a polyanion polymer, wherein the polycation polymer layer is in contact with the cation exchange membrane, wherein the polyanion polymer is comprises sulfonated hydrocarbon polymers selected from the group consisting of sulfonated poly(ether ether ketone), sulfonated polyether sulfone, sulfonated polyphenyl sulfone, sulfonated poly(2,6-dimethyl-1,4-phenylene oxide), and sulfonated polyphenylene oxide or, a polysaccharide polyanion polymer selected from the group consisting of sodium alginate, potassium alginate, calcium alginate, ammonium alginate, alginic acid, sodium hyaluronate, potassium hyaluronate, calcium hyaluronate, ammonium hyaluronate, hyaluronic acid, κ-carrageenan, λ-carrageenan, ι-carrageenan, carboxymethyl curdlan, sodium carboxymethyl curdlan, potassium carboxymethyl curdlan, calcium carboxymethyl curdlan, ammonium carboxymethyl curdlan, carboxymethyl cellulose, sodium carboxymethyl cellulose, potassium carboxymethyl cellulose, calcium carboxymethyl cellulose, ammonium carboxymethyl cellulose, pectic acid, or combinations thereof; and wherein the polycation polymer is protonated chitosan; quaternary ammonium polyamidoamine (PAMAM), Poly(vinylamine hydrochloride) (PVH), poly(allylamine hydrochloride) (PAH), poly(amidoamine hydrochloride), poly(N-isopropylallylamine hydrochloride), poly(N-tert-butylallylamine hydrochloride), poly(N-1,2-dimethylpropylallylamine hydrochloride), poly(N-methylallylamine hydrochloride), poly(N,N-dimethylallylamine hydrochloride), poly(2-vinylpiperidine hydrochloride), poly(4-vinylpiperidine hydrochloride), poly(acrylamide-co-diallyldimethylammonium chloride), a copolymer of 2-propen-1-amine-hydrochloride with N-2-propenyl-2-propen-1-aminehydrochloride, poly(N-alkyl-4-vinylpyridinium) salt, polylysine, polyornithine, polyarginine, poly(ethylene oxide)-blockpoly(vinyl benzyl trimethylammonium chloride), poly (ethylene oxide)-block-poly(l-lysine), poly(2-methacryloyloxyethyl phosphorylcholine methacrylate)-block-poly(vinyl benzyl trimethylammonium chloride), poly[2-(dimethylamino)-ethy]methacrylate, poly[3-(dimethylamino)-propyl methacrylate], poly[2-(dimethylamino)-ethyl methacrylamide], poly[3-(dimethylamino)-propyl methacrylamide], poly[2-(trimethylamino)ethyl methacrylate chloride], poly[2-(diethylamino)ethyl methacrylate], poly[2-(dimethylamino)ethyl acrylate], or combinations thereof, wherein the polyanion polymer is the same or different from the cation exchange polymer of the cation exchange membrane, and wherein a top layer of the polyelectrolyte multilayer coating is either the polycation polymer layer or the polyanion polymer layer, wherein the cation exchange polymer comprises a perfluorinated sulfonic acid-based polymer, a perfluorinated carboxylic acid polymer, a sulfonated aromatic hydrocarbon polymer, a cross-linked sulfonated aromatic hydrocarbon polymer, or combinations thereof.

2. The polyelectrolyte multilayer coated proton-exchange membrane of claim 1 wherein there is a polyelectrolyte multilayer coating on both surfaces of the cation exchange membrane.

3. The polyelectrolyte multilayer coated proton-exchange membrane of claim 1 wherein there are at least two sets of alternating layers of the polycation polymer and the polyanion polymer on the surface of the cation exchange membrane.

4. The polyelectrolyte multilayer coated proton-exchange membrane of claim 1 wherein the cation exchange polymer comprises a copolymer of tetrafluoroethylene and perfluoro-3,6-dioxa-4-methyl-7-octene-sulfonic acid, a copolymer of tetrafluoroethylene and perfluoro-5-oxa-6-heptene-sulfonic acid, a copolymer of tetrafluoroethylene and perfluoro-4-oxa-5-hexene-sulfonic acid, a copolymer of tetrafluoroethylene and perfluoro-3-oxa-4-pentene-sulfonic acid, a copolymer of perfluoro-3,6-dioxa-4-methyl-7-octene-sulfonic acid and perfluoro (2,2-dimethyl-1,3-dioxole), a copolymer of perfluoro-5-oxa-6-heptene-sulfonic acid and perfluoro (2,2-dimethyl-1,3-dioxole), a copolymer of perfluoro-4-oxa-5-hexene-sulfonic acid and perfluoro (2,2-dimethyl-1,3-dioxole), a copolymer of perfluoro-3-oxa-4-pentene-sulfonic acid and perfluoro (2,2-dimethyl-1,3-dioxole), a copolymer of perfluoro-3,6-dioxa-4-methyl-7-octene-sulfonic acid and perfluoro (2-methylene-4-methyl-1,3-dioxolane), a copolymer of perfluoro-5-oxa-6-heptene-sulfonic acid and perfluoro (2-methylene-4-methyl-1,3-dioxolane), a copolymer of perfluoro-4-oxa-5-hexene-sulfonic acid and perfluoro (2-methylene-4-methyl-1,3-dioxolane), a copolymer of perfluoro-3-oxa-4-pentene-sulfonic acid and perfluoro (2-methylene-4-methyl-1,3-dioxolane), a copolymer of perfluoro-3,6-dioxa-4-methyl-7-octene-sulfonic acid and 2,2,4-trifluoro-5-trifluoromethoxy-1,3-dioxole, a copolymer of perfluoro-5-oxa-6-heptene-sulfonic acid and 2,2,4-trifluoro-5-trifluoromethoxy-1,3-dioxole, a copolymer of perfluoro-4-oxa-5-hexenesulfonic acid and 2,2,4-trifluoro-5-trifluoromethoxy-1,3-dioxole, a copolymer of perfluoro-3-oxa-4-pentene-sulfonic acid and 2,2,4-trifluoro-5-trifluoromethoxy-1,3-dioxole, sulfonated poly(ether ether ketone) (SPEEK), sulfonated polyether sulfone, sulfonated polyphenyl sulfone, sulfonated poly(2,6-dimethyl-1,4-phenylene oxide), sulfonated poly(4-phenoxybenzoyl-1,4-phenylene), sulfonated polyphenylene oxide, sulfonated poly(phenylene), sulfonated poly(phthalazinone), cross-linked SPEEK, crosslinked sulfonated polyether sulfone, crosslinked sulfonated polyphenyl sulfone, crosslinked poly(phenylene sulfide sulfone nitrile), sulfonated polystyrene, sulfonated poly(vinyl toluene), cross-linked sulfonated polystyrene, cross-linked sulfonated poly(vinyl toluene), or combinations thereof.

5. The polyelectrolyte multilayer coated proton-exchange membrane of claim 1 wherein the polyanion polymer is different from the cation exchange polymer of the cation exchange membrane.

* * * * *